(12) United States Patent
Stam et al.

(10) Patent No.: US 9,493,265 B2
(45) Date of Patent: Nov. 15, 2016

(54) ARTICLES PREPARED FROM THERMOPLASTIC COMPOSITIONS, AND METHOD OF PREPARING SUCH ARTICLES

(71) Applicants: Erik Stam, Hoogerheide (NL); Frank Heessels, Roosendaal (NL)

(72) Inventors: Erik Stam, Hoogerheide (NL); Frank Heessels, Roosendaal (NL)

(73) Assignee: SABIC GLOBAL TECHNOLOGIES B.V. (NL)

( * ) Notice: Subject to any disclaimer, the term of this patent is extended or adjusted under 35 U.S.C. 154(b) by 28 days.

(21) Appl. No.: 13/721,583

(22) Filed: Dec. 20, 2012

(65) Prior Publication Data

US 2013/0186799 A1    Jul. 25, 2013

Related U.S. Application Data

(60) Provisional application No. 61/588,912, filed on Jan. 20, 2012.

(51) Int. Cl.
| | |
|---|---|
| *B65D 1/00* | (2006.01) |
| *C08G 64/18* | (2006.01) |
| *C08G 77/448* | (2006.01) |
| *C08G 64/08* | (2006.01) |

(52) U.S. Cl.
CPC ............ *B65D 1/00* (2013.01); *C08G 64/085* (2013.01); *C08G 64/186* (2013.01); *C08G 77/448* (2013.01)

(58) Field of Classification Search
CPC .. G08G 63/79; C08G 77/448; C08G 64/085; C08G 64/186; C08J 2383/10; C08J 83/10; C08J 9/122; C08J 9/0071; C08J 2203/06; Y10T 428/31504; Y10T 428/31507; C08L 69/00; C08L 2666/18; C08L 83/00; C08L 83/04; B65D 1/00

USPC .............. 428/35.7, 34.6, 34.7; 264/328.1; 206/524.6; 521/154
See application file for complete search history.

(56) References Cited

U.S. PATENT DOCUMENTS 4,182,238 A * 1/1980 Mitchell et al. ............... 100/99
4,319,003 A    3/1982 Gardlund
(Continued)

FOREIGN PATENT DOCUMENTS

| EP | 0635672 A1 | 1/1995 |
| JP | 3157598 A | 7/1991 |

(Continued)

OTHER PUBLICATIONS

SABIC Innovative Plastics (published 2008).*
(Continued)

*Primary Examiner* — Yan Lan
(74) *Attorney, Agent, or Firm* — Cantor Colburn LLP (57) ABSTRACT

In some embodiments, a pressure vessel comprises a rounded container comprising a thermoplastic composition. The thermoplastic composition comprises a siloxane copolymer having a structural unit of the formula (11)

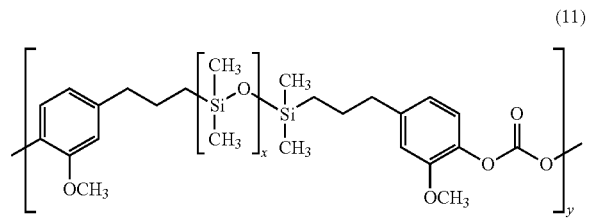

(11)

where x and y are integers representing the number of repeating units; and x is at least 1. The pressure vessel is configured to receive a fluid at an operating pressure of greater than or equal to 2 bar.

15 Claims, 2 Drawing Sheets

(56) References Cited

U.S. PATENT DOCUMENTS

| | | | |
|---|---|---|---|
| 5,051,483 | A | 9/1991 | Rock et al. |
| 5,128,034 | A | 7/1992 | Kool |
| 5,167,344 | A | 12/1992 | Van Schilt |
| 5,944,215 | A | 8/1999 | Orlowski |
| 6,539,976 | B1 | 4/2003 | Whiteside |
| 6,870,013 | B2 | 3/2005 | Silva et al. |
| 7,432,327 | B2 | 10/2008 | Glasgow et al. |
| 7,524,919 | B2 | 4/2009 | Hoover et al. |
| 7,611,811 | B2 | 11/2009 | Yu et al. |
| 7,703,821 | B2 | 4/2010 | Swain |
| 7,848,025 | B2 | 12/2010 | Hatano et al. |
| 2002/0117223 | A1 | 8/2002 | Henry et al. |
| 2007/0293608 | A1* | 12/2007 | Chen .................. C08L 69/00 524/119 |
| 2008/0110925 | A1 | 5/2008 | Hagstrom et al. |
| 2009/0069489 | A1* | 3/2009 | Vollenberg et al. .......... 524/537 |
| 2009/0069512 | A1 | 3/2009 | Yeager et al. |
| 2009/0130451 | A1 | 5/2009 | Farrell |
| 2011/0207038 | A1 | 8/2011 | Yu et al. |

FOREIGN PATENT DOCUMENTS

| | | |
|---|---|---|
| JP | 2011093312 A | 5/2011 |
| WO | 2009134892 A2 | 11/2009 |

OTHER PUBLICATIONS

Japanese Patent No. 3157598 (A); Publication Date: Jul. 5, 1991; Abstract Only; 2 Pages.

European Patent No. 0635672 (A1); Publication Date: Jan. 25, 1995; Abstract Only; 2 Pages.

International Search Report; International Application No. PCT/IB2012/057641; International Filing Date: Dec. 21, 2012; Date of Mailing: Sep. 10, 2013; 8 Pages.

Written Opinion of the International Searching Authority; International Application No. PCT/IB2012/057641; International Filing Date: Apr. 21, 2012; Date of Mailing: Sep. 10, 2013; 8 Pages.

International Preliminary Report on Patentability; International Application No. PCT/IB2012/057641; International Filing Date: Dec. 21, 2012; Date of Completion: May 14, 2014; 8 Pages.

Search Report; Chinese Application Serial No. 2012800676916; Date of Completion: Aug. 3, 2015; 2 Pages.

Boros, S. "Long-Term Hydrostatic Strength and Design of Thermoplastic Piping Compounds", Journal of ASTM International, 2011, vol. 8, No. 9.

Japanese Patent No. 2011093312(A); Date of Publication: May 12, 2011; Abstract Only; 2 Pages.

* cited by examiner

ARTICLES PREPARED FROM THERMOPLASTIC COMPOSITIONS, AND METHOD OF PREPARING SUCH ARTICLES

CROSS REFERENCE TO RELATED APPLICATIONS

This application claims priority to U.S. Provisional Application Ser. No. 61/588,912, filed Jan. 20, 2012, the contents of which is hereby incorporated in its entirety.

BACKGROUND

The present disclosure generally relates to articles prepared from thermoplastic compositions, and more particularly, to components, including transparent components, prepared from thermoplastic compositions and which are exposed to a constant pressure during use.

Thermoplastic resins are increasingly being considered to replace metal in applications that expose a component to a constant pressure during the component's operational life. Examples of components subjected to such constant pressure include, for example, pressure vessels.

One mechanism that can cause the failure of these resins is creep rupture. Accordingly, components for pressurized applications, such as components molded in styrene-acrylonitrile (SAN), are designed for a limited operational life, and/or employ thick walls to reduce stress and improve time to failure. Typically, however, many components for pressurized applications are still made of metal. Although metal components are useful, the metallic construction can add additional weight to the components and also does not allow view of any internal contents.

BRIEF DESCRIPTION

Accordingly, there exists a need for articles, such as pressure vessels, prepared from thermoplastic compositions, which exhibit desirable creep rupture properties during pressurized applications.

Embodiments described herein address these and other needs.

According to an embodiment, a pressure vessel comprises a rounded container comprising a thermoplastic composition. The thermoplastic composition comprises a siloxane copolymer having a structural unit of the formula (11)

where x and y are integers representing the number of repeating units; and x is at least 1. The pressure vessel is configured to receive a fluid at an operating pressure of greater than or equal to 2 bar.

According to another embodiment, a pressure vessel comprises a rounded container comprising a thermoplastic composition. The thermoplastic composition comprises a copolymer which comprises a polysiloxane and a material selected from the group consisting of: polycarbonate, polyphenylene oxide, polyphenylene ether, polyetherimide, a blend of polyamide and polyphenylene ether, a blend of polyphthalamide and polyphenylene oxide, polyamide, polyphthalamide, polyphenylene sulfide, polysulfone and a combination thereof. The pressure vessel is configured to receive a fluid at an operating pressure of greater than or equal to 2 bar.

In accordance with a further embodiment, a method of making a pressure vessel comprises injection molding a thermoplastic composition into a rounded container; wherein the thermoplastic composition comprises a siloxane copolymer having a structural unit of the formula (11)

where x and y are integers representing the number of repeating units; and x is at least 1. The pressure vessel is configured to receive a fluid at an operating pressure of greater than or equal to 2 bar.

BRIEF DESCRIPTION OF THE DRAWINGS

The following is a brief description of the drawings, which are presented for the purposes of illustrating the exemplary embodiments disclosed herein and not for the purposes of limiting the same.

The detailed description explains the exemplary and non-limiting embodiments disclosed herein, together with advantages and features, by way of example with reference to the drawings.

DETAILED DESCRIPTION

The inventors have determined through testing an unexpected material behavior when studying materials for fluid engineering applications involving exposure to a constant pressure over time. In such applications including, for example, plumbing applications such as faucets and valves, and manifolds used in heating systems, a dominating failure mechanism is the formation of cracks in the component over long term use. Thus, the use of plastic materials is limited for such pressurized applications.

Surprisingly, as described in further detail below, it has been determined that a thermoplastic composition comprising a siloxane copolymer, such as LEXAN* EXL provides significantly better resistance to constant pressure and creep rupture when molded than other molded thermoplastic components, such as standard polycarbonate (PC) components. Standard polycarbonate (PC) materials have limited or no suitability for pressurized applications because of their relatively poor resistance to internal pressure. The internal pressure resistance of resins can restrict its achievable useful application to certain limits of time, pressure and temperature, which renders many potential pressurized applications not suitable for operational use.

However, LEXAN* EXL, especially LEXAN* 1414T, shows a significantly better resistance to constant pressure than standard polycarbonate (PC). Not only is its creep rupture performance better in absolute terms, but also the kinetics of the behavior (change in performance as a function of time) is significantly better, which suggests that the failure mechanism is different. Thus, LEXAN* EXL is a desirable option for, for example, pressurized applications where transparency is another requirement, for which standard polycarbonate (PC) resin would have insufficient creep rupture performance. Testing by the inventors has substantiated the above unexpected findings, the details of which are set forth below under the Example section. Thus, LEXAN* EXL resins unexpectedly provide better creep rupture performance than some other resins in pressurized applications. Such properties in combination with the added benefit of transparency for pressurized components, such as pressure vessels, satisfies a need not otherwise met in the marketplace to the inventors' knowledge.

It is noted that the term "pressure vessel" is used herein to generally refer to a rounded (e.g., having a rounded side and no corners), hollow container designed for containing a fluid (i.e., a liquid or a gas) under pressure. During use, pressure acts upon the inner walls of the pressure vessel resulting in a constant stress on the material of which the pressure vessel is made. The magnitude of the stress depends upon the magnitude of the pressure and the particular design of the pressure vessel. The shape of the pressure vessel is typically round or cylindrical because these shapes minimize the stress in the material for a given pressure. It is noted, however, that the embodiments of pressure vessels disclosed herein are not limited to round and cylindrical pressure vessels.

Figure 1:
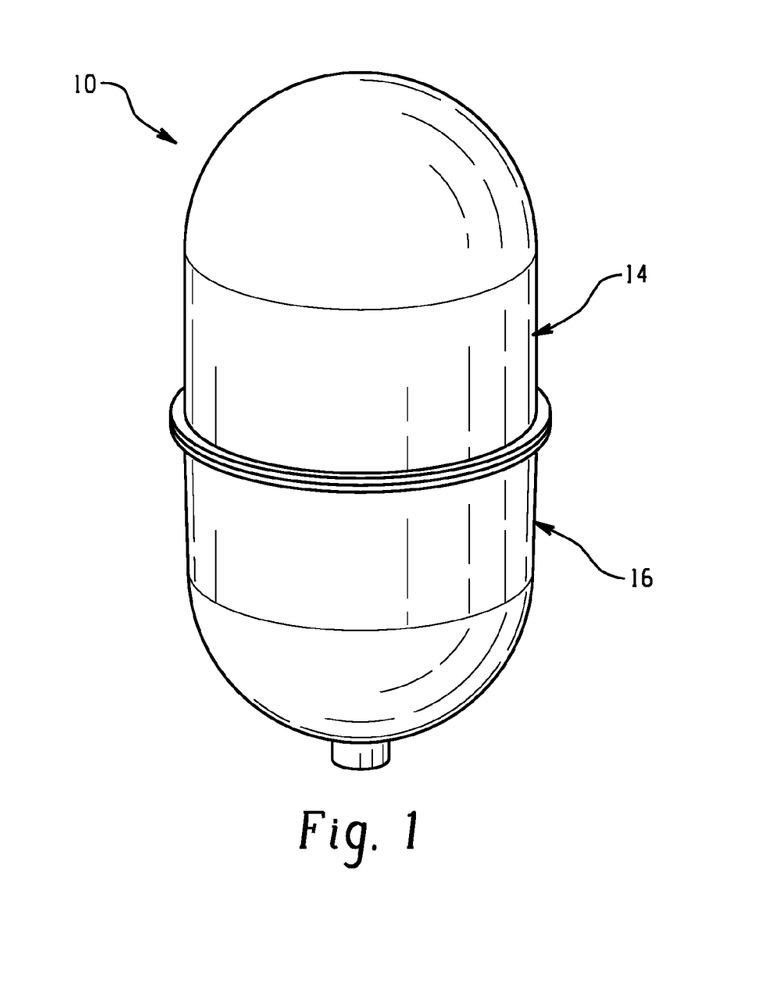
FIG. 1 depicts an example of a thermoplastic pressure vessel.

Referring now to FIG. 1, shown therein is an example of a pressure vessel 10, according to an embodiment. Pressure vessel 10 can be used as a water hammer arrestor. It is noted that pressure vessel 10 can have many alternative shapes and functions, FIG. 1 being one example presented for illustrative purposes only. A water hammer arrestor can stop the banging of water pipes by absorbing the shock of rapidly operating valves. Such water arrestors can, for example, fit on washing machine components and are relatively easy to install. Thus, a water hammer arrestor is a type of pressure vessel having a diaphragm mounted inside and the functionality of the component can depend on the diaphragm.

It is noted that water hammer arrestors are typically made of a metallic shell construction which does not allow view of any internal features. It would be advantageous if, for example, a plumber installing a water hammer arrestor in a plumbing system of a house could view an internal diaphragm of the water hammer arrestor upon mounting because that would enable the plumber to confirm that the device is functioning and fitting properly. Such viewing of a diaphragm is not possible with use of a metal water hammer arrestor and thus installation may be more difficult. Also, a metal construction may increase the weight of the component and may subject the component to potential corrosion.

Figure 2:
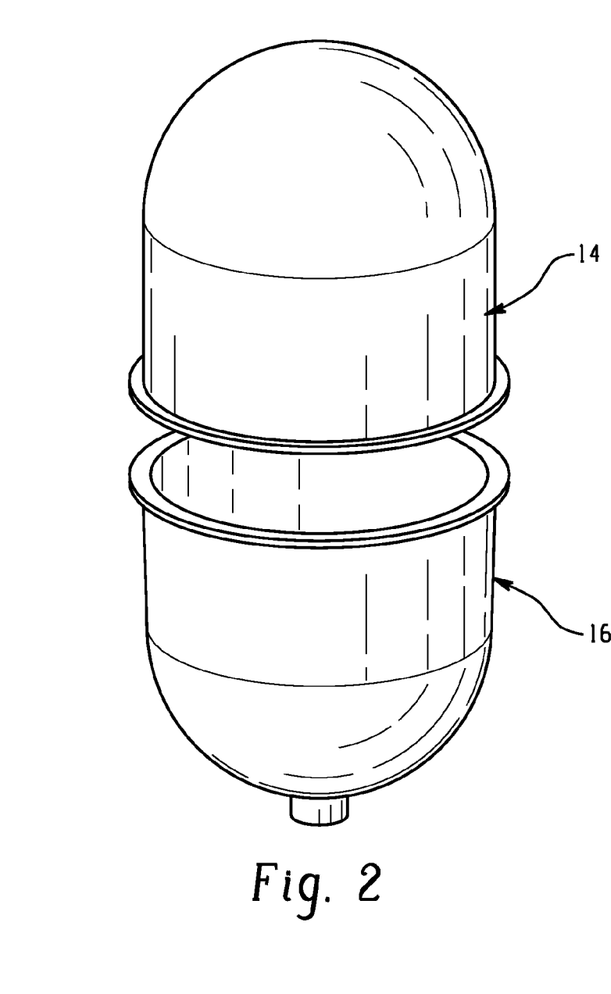
FIG. 2 depicts the pressure vessel of FIG. 1 separated into a first portion and a second portion.

FIG. 2 depicts an internal hollow feature of the pressure vessel 10 shown in FIG. 1. As shown in FIG. 2, pressure vessel 10 includes an outer cover first portion 14 and an outer cover second portion 16, which is separable from and joinable to the first portion 14. Pressure vessel 10 can comprise an inner member or diaphragm (not shown).

Advantageously, a portion of pressure vessel 10 can be transparent thereby allowing view of internal features of the vessel 10. For example, either or both portions 14, 16 of pressure vessel 10 can be transparent thereby allowing view an inner member (not shown). Alternatively, other portions of pressure vessel 10 could be transparent or the entire article can be transparent. Thus, the term "transparent" as used herein is intended to have its ordinary meaning of see through. This design satisfies an unmet need that, for example, an inner portion or membrane easily and economically can be installed and monitored for proper functioning and wear without dismantling the pressure vessel 10. Alternatively, a portion or the entire pressure vessel 10 could be opaque, thereby offering further design flexibility.

In accordance with an embodiment, pressure vessel 10 is formed in the shape of a rounded container and comprises a thermoplastic composition. The thermoplastic composition comprises a siloxane copolymer. For example, the thermoplastic composition can comprise a poly(siloxane-carbonate) copolymer, also referred to as a polysiloxane-polycarbonate or a polydiorganosiloxane-carbonate. The poly (siloxane-carbonate) can contain diorganosiloxane ("siloxane") units, generally in the form of blocks. The polydiorganosiloxane ("polysiloxane") blocks of the copolymer comprise repeating siloxane units as in formula (1)

(1)

wherein each R is independently a $C_{1-13}$ monovalent organic group. For example, R can be a $C_1$-$C_{13}$ alkyl, $C_1$-$C_{13}$ alkoxy, $C_2$-$C_{13}$ alkenyl group, $C_2$-$C_{13}$ alkenyloxy, $C_3$-$C_6$ cycloalkyl, $C_3$-$C_6$ cycloalkoxy, $C_6$-$C_{14}$ aryl, $C_6$-$C_{10}$ aryloxy, $C_7$-$C_{13}$ arylalkyl, $C_7$-$C_{13}$ aralkoxy, $C_7$-$C_{13}$ alkylaryl, or $C_7$-$C_{13}$ alkylaryloxy. The foregoing groups can be fully or partially halogenated with fluorine, chlorine, bromine, or iodine, or a combination thereof. In an embodiment, where a transparent polysiloxane-polycarbonate is desired, R is unsubstituted by halogen. Combinations of the foregoing R groups can be used in the same copolymer.

The value of E in formula (1) can vary widely depending on the type and relative amount of each component in the thermoplastic composition, the desired properties of the composition, and like considerations. Generally, E has an average value of 2 to about 1,000, specifically about 2 to about 500, more specifically about 5 to about 100. In an embodiment, E has an average value of about 10 to about 75, and in still another embodiment, E has an average value of about 40 to about 60. Where E is of a lower value, e.g., less than about 40, it can be desirable to use a relatively larger amount of the polycarbonate-polysiloxane copolymer. Conversely, where E is of a higher value, e.g., greater than about 40, a relatively lower amount of the polycarbonate-polysiloxane copolymer can be used.

A combination of a first and a second (or more) polycarbonate-polysiloxane copolymers can be used, wherein the average value of E of the first copolymer is less than the average value of E of the second copolymer.

In an embodiment, the polysiloxane blocks are of formula (2)

(2)

wherein E is as defined above; each R can be the same or different, and is as defined above; and Ar can be the same or different, and is a substituted or unsubstituted $C_6$-$C_{30}$ arylene group, wherein the bonds are directly connected to an aromatic moiety. Ar groups in formula (2) can be derived from a $C_6$-$C_{30}$ dihydroxyarylene compound, for example a dihydroxyarylene compound of formula (3) or (6).

Formula (3) is an example of a dihydroxy aromatic compound:

(3)

wherein $R^a$ and $R^b$ are each independently a halogen or $C_{1-12}$ alkyl group; and p and q are each independently integers of 0 to 4. It will be understood that $R^a$ is hydrogen when p is 0, and likewise $R^b$ is hydrogen when q is 0. Also in formula (3), $X^a$ is a bridging group connecting the two hydroxy-substituted aromatic groups, where the bridging group and the hydroxy substituent of each $C_6$ arylene group are disposed ortho, meta, or para (specifically para) to each other on the $C_6$ arylene group. In an embodiment, the bridging group $X^a$ is single bond, —O—, —S—, —S(O)—, —S(O)$_2$—, —C(O)—, or a $C_{1-18}$ organic group. The $C_{1-18}$ organic bridging group can be cyclic or acyclic, aromatic or non-aromatic, and can further comprise heteroatoms such as halogens, oxygen, nitrogen, sulfur, silicon, or phosphorous. The $C_{1-18}$ organic group can be disposed such that the $C_6$ arylene groups connected thereto are each connected to a common alkylidene carbon or to different carbons of the $C_{1-18}$ organic bridging group. In an embodiment, p and q are each 1, and $R^a$ and $R^b$ are each a $C_{1-3}$ alkyl group, specifically methyl, disposed meta to the hydroxy group on each arylene group.

In an embodiment, $X^a$ is a substituted or unsubstituted $C_{3-18}$ cycloalkylidene, a $C_{1-25}$ alkylidene of formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl, or a group of the formula —C(=$R^e$)— wherein $R^e$ is a divalent $C_{1-12}$ hydrocarbon group. Exemplary groups of this type include methylene, cyclohexylmethylene, ethylidene, neopentylidene, and isopropylidene, as well as 2-[2.2.1]-bicycloheptylidene, cyclohexylidene, cyclopentylidene, cyclododecylidene, and adamantylidene. A specific example wherein $X^a$ is a substituted cycloalkylidene is the cyclohexylidene-bridged, alkyl-substituted bisphenol of formula (4)

(4)

wherein $R^{a'}$ and $R^{b'}$ are each independently $C_{1-12}$ alkyl, $R^g$ is $C_{1-12}$ alkyl or halogen, r and s are each independently 1 to 4, and t is 0 to 10. In a specific embodiment, at least one of each of $R^{a'}$ and $R^{b'}$ are disposed meta to the cyclohexylidene bridging group. The substituents $R^{a'}$, $R^{b'}$, and $R^g$ can, when comprising an appropriate number of carbon atoms, be straight chain, cyclic, bicyclic, branched, saturated, or unsaturated. In an embodiment, $R^{a'}$ and $R^{b'}$ are each independently $C_{1-4}$ alkyl, $R^g$ is $C_{1-4}$ alkyl, r and s are each 1, and t is 0 to 5. In another specific embodiment, $R^{a'}$, $R^{b'}$ and $R^g$ are each methyl, r and s are each 1, and t is 0 or 3. The cyclohexylidene-bridged bisphenol can be the reaction product of two moles of o-cresol with one mole of cyclohexanone. In another exemplary embodiment, the cyclohexylidene-bridged bisphenol is the reaction product of two moles of a cresol with one mole of a hydrogenated isophorone (e.g., 1,1,3-trimethyl-3-cyclohexane-5-one). Such cyclohexane-containing bisphenols, for example the reaction product of two moles of a phenol with one mole of a hydrogenated isophorone, are useful for making polycarbonate polymers with high glass transition temperatures and high heat distortion temperatures.

In another embodiment, $X^a$ is a $C_{1-18}$ alkylene group, a $C_{3-18}$ cycloalkylene group, a fused $C_{6-18}$ cycloalkylene group, or a group of the formula —$B^1$—W—$B^2$— wherein $B^1$ and $B^2$ are the same or different $C_{1-6}$ alkylene group and W is a $C_{3-12}$ cycloalkylidene group or a $C_{6-16}$ arylene group.

$X^a$ can also be a substituted $C_{3-18}$ cycloalkylidene of formula (5)

(5)

wherein $R^r$, $R^p$, $R^q$, and $R^t$ are each independently hydrogen, halogen, oxygen, or $C_{1-12}$ organic groups; I is a direct bond, a carbon, or a divalent oxygen, sulfur, or —N(Z)— where Z is hydrogen, halogen, hydroxy, $C_{1-12}$ alkyl, $C_{1-12}$ alkoxy, or $C_{1-12}$ acyl; h is 0 to 2, j is 1 or 2, i is an integer of 0 or 1, and k is an integer of 0 to 3, with the proviso that at least two of $R^r$, $R^p$, $R^q$, and $R^t$ taken together are a fused cycloaliphatic, aromatic, or heteroaromatic ring. It will be understood that where the fused ring is aromatic, the ring as shown in formula (5) will have an unsaturated carbon-carbon linkage where the ring is fused. When k is one and i is 0, the ring as shown in formula (5) contains 4 carbon atoms, when k is 2, the ring as shown in formula (5) contains 5 carbon atoms, and when k is 3, the ring contains 6 carbon atoms. In an embodiment, two adjacent groups (e.g., $R^q$ and $R^t$ taken together) form an aromatic group, and in another embodiment, $R^q$ and $R^t$ taken together form one aromatic group and $R^r$ and $R^t$ taken together form a second aromatic group.

When $R^q$ and $R^t$ taken together form an aromatic group, R' can be a double-bonded oxygen atom, i.e., a ketone.

Other useful aromatic dihydroxy compounds of the formula HO—$R^1$—OH include compounds of formula (6)

(6)

wherein each $R^h$ is independently a halogen atom, a $C_{1-10}$ hydrocarbyl such as a $C_{1-10}$ alkyl group, a halogen-substituted $C_{1-10}$ alkyl group, a $C_{6-10}$ aryl group, or a halogen-substituted $C_{6-10}$ aryl group, and n is 0 to 4. The halogen is usually bromine.

Exemplary dihydroxyarylene compounds are 1,1-bis(4-hydroxyphenyl) methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, 1,1-bis(4-hydroxyphenyl)propane, 1,1-bis(4-hydroxyphenyl) n-butane, 2,2-bis(4-hydroxy-1-methylphenyl)propane, 1,1-bis(4-hydroxyphenyl)cyclohexane, bis(4-hydroxyphenyl sulfide), and 1,1-bis(4-hydroxy-t-butylphenyl)propane. Combinations comprising at least one of the foregoing dihydroxy compounds can also be used.

In another embodiment, the polysiloxane blocks are of formula (7)

(7)

wherein R and E are as described above, and each $R^5$ is independently a divalent $C_1$-$C_{30}$ organic group, and wherein the polymerized polysiloxane unit is the reaction residue of its corresponding dihydroxy compound. In a specific embodiment, the polysiloxane blocks are of formula (8):

(8)

wherein R and E are as defined above. $R^6$ in formula (14) is a divalent $C_2$-$C_8$ aliphatic group. Each M in formula (8) can be the same or different, and can be a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkylaryl, or $C_7$-$C_{12}$ alkylaryloxy, wherein each n is independently 0, 1, 2, 3, or 4.

In an embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R^2$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a combination of methyl and trifluoropropyl, or a combination of methyl and phenyl. In still another embodiment, M is methoxy, n is one, $R^2$ is a divalent $C_1$-$C_3$ aliphatic group, and R is methyl.

Blocks of formula (8) can be derived from the corresponding dihydroxy siloxane formula (9)

(9)

wherein R, E, M, $R^6$, and n are as described above. Such dihydroxy polysiloxanes can be made by effecting a platinum-catalyzed addition between a siloxane hydride of formula (10)

(10)

wherein R and E are as previously defined, and an aliphatically unsaturated monohydric phenol. Exemplary aliphatically unsaturated monohydric phenols include eugenol, 2-alkylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol and 2-allyl-4,6-dimethylphenol. Combinations comprising at least one of the foregoing can also be used.

The poly(siloxane-carbonate) can comprise 50 to 99 weight percent of carbonate units and 1 to 50 weight percent siloxane units. Within this range, the poly(siloxane-carbonate)copolymer can comprise 70 to 98 weight percent, more specifically 75 to 97 weight percent of carbonate units and 2 to 30 weight percent, more specifically 3 to 25 weight percent siloxane units.

Poly(siloxane-carbonate)s can have a weight average molecular weight of 2,000 to 100,000 Daltons, specifically 5,000 to 50,000 Daltons as measured by gel permeation chromatography using a cross-linked styrene-divinyl benzene column, at a sample concentration of 1 milligram per milliliter, and as calibrated with polycarbonate standards.

The poly(siloxane-carbonate) can have a melt volume flow rate, measured at 300° C./1.2 kg, of 1 to 50 cubic centimeters per 10 minutes (cc/10 min), specifically 2 to 30 cc/10 min. Mixtures of poly(siloxane-carbonate)s of different flow properties can be used to achieve the overall desired flow property.

In an embodiment, the thermoplastic composition comprises a siloxane copolymer having a structural unit of the formula (11)

(11)

where x and y are integers representing the number of repeating units; and x is at least one.

In another embodiment, the thermoplastic composition comprises the formula (12)

(12)

wherein x, y, and z are integers representing the number of repeating units; and x is at least 1. As noted above, formula (12) provides the molecular structure of the polycarbonate (PC) siloxane resin LEXAN* EXL 1414T. LEXAN* EXL 1414T resin is available in, for example, pellet and sheet form, and can be used for injection molding, structural foam molding and thermoforming LEXAN* EXL 1414T polycarbonate (PC) siloxane copolymer resin is a transparent injection molding grade. This resin offers low temperature (e.g., −40° C.) ductility in combination with effective flow characteristics and excellent processability with opportunities for shorter injection molding (IM) cycle times compared to standard polycarbonate (PC). This specialized material has poly(dimethylsiloxane) (PDMS) segments in its polymer chain backbone and a Youngs' Modulus of 2206 MPa, a glass transition temperature (Tg) of 150° C., and a coefficient of thermal expansion of 6.6×10$^{-6}$/° C. It also has a melt temperature of 305° C. and a mold temperature of 85° C.

In further embodiments, the thermoplastic composition comprises a copolymer comprising polysiloxane and a material selected from the group consisting of: polycarbonate (PC), polyphenylene oxide (PPO), polyphenylene ether (PPE), polyetherimide (PEI), a blend of polyamide (PA) and PPE (e.g., Noryl GTX* resin available from SABIC Innovative Plastics IP B.V.), PA, a blend of PPO and PA, polyphthalamide (PPA), polyphenylene sulfide (PPS), polysulfone (PSU) and combinations thereof.

The thermoplastic compositions described herein can be manufactured by methods generally available in the art. For example, LEXAN* 1414T resin is commercially available as noted above and can be polymerized and compounded into pellet form in accordance with methods generally known.

According to one manner of proceeding, which is meant to be an example and therefore not limiting, powdered thermoplastic material, such as LEXAN* EXL 1414T resin, can be fed into the throat of an extruder via a hopper. The extruder is generally operated at a temperature higher than that necessary to cause the composition to flow, but at which temperature constituents of the thermoplastic composition do not decompose so as to significantly adversely affect the composition. The extrudate then can be immediately quenched in a water bath and pelletized. The pellets, so prepared when cutting the extrudate, can be, for example, one-fourth inch long (0.635 cm) or less as desired. Such pellets can be used for subsequent molding, shaping or forming.

The thermoplastic composition can be provided as pellets, for example, as described above, and is useful to form articles for pressurized applications, such as pressure vessel 10. In an embodiment, the thermoplastic composition can be molded into the desired useful shaped articles by injection molding or other suitable techniques. Injection molding is a conventional manufacturing process where, for example, a block of metal such as a steel structure can includes a cavity of desired shape in which molten material can be injected. Upon cooling, the structure is opened and the article of desired shape can be removed. Desirably, the thermoplastic composition has good mold filling capability due to its flow properties. Thus, a method of manufacturing an article, such as pressure vessel 10, by injection molding also is disclosed according to an embodiment.

Products (e.g. articles or components) made from the afore-described thermoplastic composition can be used in pressurized applications, for example, water pressure vessel applications, which are further described below.

Examples of articles or products for such pressurized applications include, but are not limited to, water hammer arrestors, faucets, valves, manifolds, fittings, water filter housings, filters, expansion vessels, hydro blocks, water pumps, water meters, reverse osmoses systems, pressure booster tanks, water meter housings, water tanks, heating expansion vessels, hot water filter housings, hot water storage tanks for, e.g., heating systems and solar hot water collectors with integrated storage, potable water filter housings, and so forth.

In some embodiments, the resultant article, such as a water hammer arrestor, can comprise more than one part which is assembled together into the final product, wherein at least a portion of the article is transparent. Thus, the components of the product can be manufactured separately and assembled as one of ordinary skill in the art would understand. For example, one or more of the assembled components can be made of injection molded LEXAN* 1414T or other desired thermoplastic material and one or more other components can be made of another material, such as a non-transparent material or metal, for example.

Table 1 sets forth approximate application parameters for pressure vessel 10, in accordance with an embodiment.

TABLE 1

| | |
|---|---|
| Temperature | Up to about 40° C. (optional up to about 50° C.) |
| Constant Pressure | Up to about 8 bars (optional up to about 10 bars) |
| Burst Pressure | Up to about 24 bars (optional up to about 30 bars) |
| Pressure Cycle Resistance | Up to about 50,000 cycles @ about 23° C., and about 2 to about 8 bars |
| Leak Test | Up to about 1.43 × 8 bars (optional Up to about 10 bar) |
| Lifetime | Up to about 5 years |

Thus, the above Table 1 indicates that a desired, minimum requirement for water application of a pressure vessel 10 in accordance with an embodiment, such as pressure vessel 10, is that the vessel can withstand up to about 8 bars of water/fluid pressure at up to about 40° C. for up to about 5 years. For a water arrestor application described above, this would result in withstanding up to about 25 MPa hoop stress for up to about 5 years at up to about 40° C.

As a further example, typical operating conditions for pressure vessel 10 used in, for example, a domestic (non-commercial) environment include an operational pressure of greater than or equal to 2 bars, and specifically up to and including 10 bars; an operational temperature of ambient to greater than or equal to 90° C. for heating systems (possibly higher); and an operational lifetime (e.g., exposure to constant pressure) of greater than or equal to 5 years for water filters, greater than or equal to 15 years for components in domestic heating systems, and greater than or equal to 30 years for solar hot water systems. In general, pressure vessel 10 typically can have an operational life (e.g., exposure to constant pressure) of greater than or equal to 3 years. Specific exemplary ranges for the operational life at constant pressure include 5 to 30 years, 10 to 25 years and 15 to 20 years.

Figure 3:
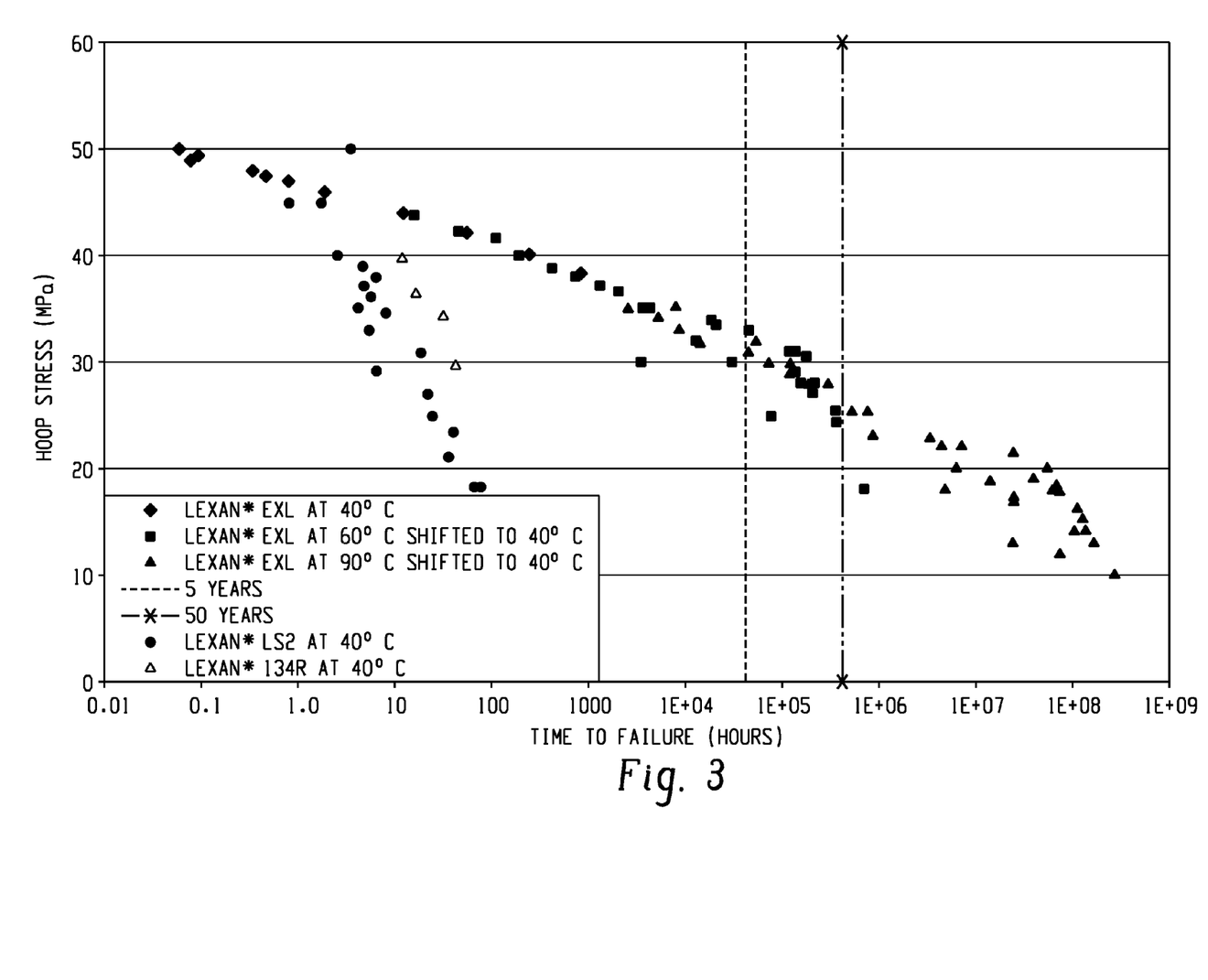
FIG. 3 is a graph showing comparative creep rupture results for LEXAN* EXL resin compared to LEXAN* LS2 AND LEXAN* 134R resins.

It has further been determined that pressure vessels according to embodiments also could have a thinner wall than, for example, other pressure vessels, such as pressure vessels made of SAN. For example, examination of a cold water filter made of SAN having an inner diameter of 75.4 mm and a wall thickness of 5.8 mm resulted in a hoop stress of 7 MPa if 10 bars of constant pressure would be inside the water filter at 40° C. for an operational life time of 5 years (5 year exposure to the constant pressure of 10 bars). Referring to FIG. 3, described below, to determine an estimate for what maximum stress would correspond with 5 years of exposure to the constant pressure for LEXAN* EXL at 40° C., results in 26 MPa and a wall thickness of 1.5 mm. Accordingly, the benefit would be a wall thickness reduction from 5.8 mm to 1.5 mm (about 74% reduction).

Embodiments are further illustrated by the following non-limiting Example.

EXAMPLE

Introduction

The inventors produced molded pressure samples (pressure vessel samples) of LEXAN* LS2 and LEXAN* 134R to conduct a side by side comparison to a molded sample of LEXAN* EXL under the same manufacturing and testing conditions. Testing included exposing the samples to different pressures and temperatures and making an extrapolation of observed behavior. Advantageously, the testing results demonstrated that LEXAN* EXL has a better resistance to internal pressure and exhibits unexpected material behavior in pressurized applications, particularly in cold water pressure vessel applications.

1. Purpose: The purpose of this Example is to show the creep rupture performance for LEXAN* LS2 and LEXAN* 134R in comparison to that of LEXAN* EXL.

2. Material: LEXAN* LS2, LEXAN* 134R and LEXAN* EXL 1414T, all commercially available from SABIC Innovative Plastics IP B.V.

3. Techniques/Procedures:

Pressure vessel samples and an associated clamp ring were used for testing and to simulate operation/application conditions. The samples were conventionally molded by injection molding. The samples were top gated and side gated (which indicates where the thermoplastic composition flows into the cavity upon injection molding). A summary of the parameters for these samples is set forth in Table 2.

TABLE 2

| Injection molded |
|---|
| Two gate locations: <br>    top gate: without knit line <br>    side gate: with knit line <br> Inner diameter: 42 millimeters (mm) <br> Thickness: 3 mm |

The creep rupture performance of the pressure vessel samples was demonstrated by conducting long term resistance to internal pressure testing according to the known standard ISO 1167 (ASTM D 1598). For example, one end of a sample pressure vessel was mounted on a steel plug and through the plug pressure was applied.

In general, according to pressure resistance testing and after a period of time depending upon the applied temperature and pressure, cracks can develop in a sample. The cracks can form through the wall thickness of the sample and then water can begin to leak through the sample wall, which would represent failure of a sample. This type of testing is useful to simulate application. For example, a failure of a water hammer arrestor could be indicated by leakage of water under a sink from the arrestor indicating a crack in the arrestor's wall.

Table 3 below provides a summary of testing parameters.

TABLE 3

| Samples Tested with and without knit line |
|---|
| pressure resistance testing according to ISO 1167 (ASTM D 1598): <br> time to failure in sustained pressure conditions (creep rupture) <br> standard temperature: 40° C., but higher temperature used to predict long term performance using time temperature shifting |

Thus, testing of the time until leakage of the samples was conducted at different temperatures and pressures, as shown in FIG. 3, and described below.

4. Results: FIG. 3 graphically shows the creep rupture results for the tested material in terms of hoop stress (MPa)

and time to failure (hours). Data have been generated with samples exposed continuously to 40° C. Also, samples have been exposed to 60° C. and 90° C. and data shifted to the right to predict long term performance at 40° C.

Discussion of Results and Observations Regarding the Above Testing

The strength property of the samples as a function of temperature and pressure was the focus of the above testing as measured by time to failure. The testing results demonstrate that LEXAN* EXL performed significantly better than the other tested materials. This is demonstrated by the above-referenced graph where the sloping line for LEXAN* EXL is more horizontal than that of the other tested materials indicating that this material exhibited better behavior under the testing conditions. The demonstrated behavior of LEXAN* EXL was unique and unexpected under pressurized conditions in that not only was the absolute performance better (sloping line in general above that of the other tested materials), but more significantly, the slope for LEXAN* EXL was much shallower (more horizontal). Thus, at higher pressures, there was a much less strong/adverse effect on this material demonstrated by the more horizontal line.

The test considered above, time to failure after exposure to constant pressure, typically results in cracks growing slowly through a polycarbonate material sample until a sample fails. However, LEXAN*EXL resin unexpectedly deviated from this normal behavior in the sense that, for instance, cracks grow significantly slower. This was not expected based on, for example, what the inventors know of the properties of LEXAN* EXL compared to other LEXAN* resins.

Advantageously, the inventors have determined that the unique properties of LEXAN* EXL, e.g., LEXAN* EXL 1414T, resin allow the manufacture of molded transparent articles, such as transparent cold water pressure vessels, with effective creep rupture performance under conditions of constant pressure. Further properties of LEXAN* EXL 1414T resin are set forth in Table 4.

TABLE 4

|  | Value | Unit | Standard |
|---|---|---|---|
| Mechanical |  |  |  |
| Tensile Stress, yld, Type I, 50 mm/min | 580 | kgf/cm$^2$ | ASTM D 638 |
| Tensile Stress, brk, Type I, 50 mm/min | 600 | kgf/cm$^2$ | ASTM D 638 |
| Tensile Strain, yld, Type I, 50 mm/min | 5.6 | % | ASTM D 638 |
| Tensile Strain, brk, Type I, 50 mm/min | 123.9 | % | ASTM D 638 |
| Tensile Modulus, 50 mm/min | 22300 | kgf/cm$^2$ | ASTM D 638 |
| Flexural Stress, yld, 1.3 mm/min, 50 mm span | 930 | kgf/cm$^2$ | ASTM D 790 |
| Flexural Modulus, 1.3 mm/min, 50 mm span | 22200 | kgf/cm$^2$ | ASTM D 790 |
| Tensile Stress, yield 50 mm/min | 56 | MPa | ISO 527 |
| Tensile Stress, break, 50 mm/min | 55 | MPa | ISO 527 |
| Tensile Strain, yield 50 mm/min | 5.4 | % | ISO 527 |
| Tensile Strain, break, 50 mm/min | 108.5 | % | ISO 527 |
| Tensile Modulus, 1 mm/min | 2300 | MPa | ISO 527 |
| Flexural Stress, yield, 2 mm/min | 88 | MPa | ISO 178 |
| Flexural Modulus, 2 mm/min | 2120 | MPa | ISO 178 |
| Hardness, Rockwell L | 87 | — | ISO 2039-2 |
| Impact |  |  |  |
| Izod Impact, notched, 23° C. | 84 | cm-kgf/cm | ASTM D 256 |
| Izod Impact, notched, −30° C. | 72 | cm-kgf/cm | ASTM D 256 |
| Instrumental Impact Total Energy, 23° C. | 769 | cm-kgf | ASTM D 3763 |
| Instrumental Impact Total Energy, −30° C. | 789 | cm-kgf | ASTM D 3763 |
| Izod Impact, unnotched 80 * 10 * 3 +23° C. | NB | kJ/m$^2$ | ISO 180/1U |
| Izod Impact, unnotched 80 * 10 * 3 −30° C. | NB | kJ/m$^2$ | ISO 180/1A |
| Izod Impact, notched 80 * 10 * 3 +23° C. | 65 | kJ/m$^2$ | ISO 180/1A |
| Izod Impact, notched 80 * 10 * 3 −30° C. | 55 | kJ/m$^2$ | ISO 179/1eA |
| Charpy 23° C., V-notch Edgew 80 * 10 * 3 sp = 62 mm | 70 | kJ/m$^2$ | ISO 179/1eA |
| Charpy −30° C., V-notch Edgew 80 * 10 * 3 sp = 62 mm | 60 | kJ/m$^2$ | ISO 179/1eU |
| Charpy 23° C., Unnotch Edgew 80 * 10 * 3 sp = 62 mm | NB | kJ/m$^2$ | ISO 179/1eU |
| Charpy −30° C., Unnotch Edgew 80 * 10 * 3 sp = 62 mm | NB | kJ/m$^2$ | ISO 179/1eU |
| Thermal |  |  |  |
| Vicat Softening Temp, Rate A/50 | 138 | ° C. | ASTM D 1525 |
| HDT, 1.82 MPa, 3.2 mm, unannealed | 120 | ° C. | ASTM D 648 |
| CTE, −40° C. to 95° C., flow | 6.7E−05 | 1/° C. | ASTM E 831 |
| CTE, −40° C. to 95° C., xflow | 8.E−05 | 1/° C. | ASTM E 831 |
| CTE, 23° C. to 80° C., flow | 6.7E−05 | 1/° C. | ISO 11359-2 |
| CTE, 23° C. to 80° C., xflow | 8.E−05 | 1/° C. | ISO 11359-2 |
| Ball Pressure Test, 125° C. +/− 2° C. | pass |  | IEC 60695-10-2 |
| Vicat Softening Temp, Rate B/50 | 138 | ° C. | ISO 306 |
| Vicat Softening Temp, Rate B/120 | 139 | ° C. | ISO 306 |
| HDT/Af, 1.8 MPa Flatw 80 * 10 * 4 sp = 64 mm | 116 | ° C. | ISO 75/Af |
| Relative Temp Index, Elec | 130 | ° C. | UL746B |
| Relative Temp Index, Mech w/o impact | 130 | ° C. | UL746B |

TABLE 4-continued

| Physical | | | |
|---|---|---|---|
| Specific Gravity | 1.19 | — | ASTM D 792 |
| Mold Shrinkage, flow, 3.2 mm | 0.4-0.8 | % | SABIC Method |
| Mold Shrinkage, xflow, 3.2 mm | 0.4-0.8 | % | SABIC Method |
| Melt Flow Rate, 300° C./1.2 kgf | 10 | g/10 min | ASTM D 1238 |
| Density | 1.19 | g/cm$^3$ | ISO 1183 |
| Water Absorption, (23° C./sat) | 0.12 | % | ISO 62 |
| Moisture Absorption (23° C./50% RH) | 0.09 | % | ISO 62 |
| Melt Volume Rate, MVR at 300° C./1.2 kg | 9 | cm$^3$/10 min | ISO 1133 |
| Optical | | | |
| Light Transmission, 2.54 mm | 82 | % | ASTM D 1003 |
| Haze, 2.54 mm | 3 | % | ASTM D 1003 |
| Electrical | | | |
| Volume Resistivity | >1.E+15 | Ohm-cm | ASTM D 257 |
| Surface Resistivity | >1.E+15 | Ohm | ASTM D 257 |
| Flame Characteristics | | | |
| UL Recognized, 94HB Flame Class Rating 2nd value (3) | 0.8 | Mm | UL 94 |
| UL Recognized, 94V-2 Flame Class Rating (3) | 3 | Mm | UL 94 |
| Glow Wire Flammability Index 960° C., passes at | 3 | Mm | IEC 60695-2-12 |
| Glow Wire Ignitability Temperature, 0.8 mm | 850 | ° C. | IEC 60695-2-13 |
| Glow Wire Ignitability Temperature, 3.0 mm | 850 | ° C. | IEC 60695-2-13 |

| Injection Molding | Value | Standard |
|---|---|---|
| Drying Temperature | 120 | ° C. |
| Drying Time | 3-4 | hrs |
| Drying Time (Cumulative) | 48 | hrs |
| Maximum Moisture Content | 0.02 | % |
| Melt Temperature | 295-315 | ° C. |
| Nozzle Temperature | 290-310 | ° C. |
| Front - Zone 3 Temperature | 295-315 | ° C. |
| Middle - Zone 2 Temperature | 280-305 | ° C. |
| Rear - Zone 1 Temperature | 270-295 | ° C. |
| Mold Temperature | 70-95 | ° C. |
| Back Pressure | 0.3-0.7 | MPa |
| Screw Speed | 40-70 | rpm |
| Shot to Cylinder Size | 40-60 | % |
| Vent Depth | 0.025-0.076 | mm |

Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements can be combined in any suitable manner in the various combinations. Moreover, in general, the embodiments disclosed herein can alternatively comprise, consist of, or consist essentially of, any appropriate components disclosed. Also, any ranges disclosed herein are inclusive of the endpoints, and the endpoints are independently combinable with each other.

While particular, embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications, variations, improvements, and substantial equivalents.

What is claimed is:

1. A pressure vessel comprising a rounded container comprising a thermoplastic composition, the thermoplastic composition comprising a siloxane copolymer having a structural unit of the following formula where x, y, and z are integers representing the number of repeating units; and x is at least 1; and
wherein the pressure vessel is configured to receive and contain a fluid at an operating pressure of greater than or equal to 2 bar, and wherein at least one of (i) the pressure vessel is configured to be constantly exposed to the operating pressure for greater than or equal to 3 years without leakage, and (ii) the pressure vessel is configured to be exposed to a constant pressure for greater than or equal to 3 years without failure as determined in accordance with ASTM D 1598.

2. The pressure vessel of claim 1, wherein the thermoplastic composition comprises the formula (12)

(12)

where z is an integer representing the number of repeating units.

3. The pressure vessel of claim 1, wherein a portion of the pressure vessel is transparent.

4. The pressure vessel of claim 3, comprising an inner member visible through an outer wall of the pressure vessel.

5. The pressure vessel of claim 1, wherein the pressure vessel is configured to have a resistance to an internal pressure and a corresponding hoop stress of greater than or equal to 25 MPa during greater than or equal to 5 years of operation at greater than or equal to 40° C. when measured according to ISO 1167/ASTM D 1598 Standard.

6. The pressure vessel of claim 1, wherein the pressure vessel is selected from the group consisting of a water hammer arrestor, a water filter housing, an expansion vessel, a reverse osmoses system, a pressure booster tank, a water meter housing, a water tank, a storage tank, and a combination thereof.

7. The pressure vessel of claim 1, wherein the pressure vessel comprises assembled components and at least one of the assembled components comprises formula (11).

8. The pressure vessel of claim 1, wherein the operating pressure is up to 10 bars.

9. The pressure vessel of claim 1, wherein the operating pressure is up to 8 bars.

10. The pressure vessel of claim 1, wherein the pressure vessel is configured to be constantly exposed to the operating pressure for greater than or equal to 3 years without leakage.

11. The pressure vessel of claim 10, wherein the pressure vessel is configured to be exposed to a constant pressure for greater than or equal to 3 years without failure as determined in accordance with ASTM D 1598.

12. The pressure vessel of claim 1, wherein the pressure vessel comprises no corners.

13. A method of making a pressure vessel comprising:
   injection molding a thermoplastic composition into a rounded container;
   wherein the thermoplastic composition comprises a siloxane copolymer having a structural unit of the following formula where x, y, and z are integers representing the number of repeating units; and x is at least 1; and
wherein the pressure vessel is configured to receive a fluid at an operating pressure of greater than or equal to 2 bar, and wherein at least one of (i) the pressure vessel is configured to be constantly exposed to the operating pressure for greater than or equal to 3 years without leakage, and (ii) the pressure vessel is configured to be exposed to a constant pressure for greater than or equal to 3 years without failure as determined in accordance with ASTM D 1598.

14. The method of claim 13, wherein the thermoplastic material comprises the formula (12)

where z is an integer representing the number of repeating units.

15. The method of claim 14, wherein the pressure vessel is selected from the group consisting of a water hammer arrestor, a water filter housing, an expansion vessel, a reverse osmoses system, a pressure booster tank, a water meter housing, a water tank, a storage tank, and a combination thereof.

* * * * *